United States Patent [19]

Moore et al.

[11] 4,243,491
[45] Jan. 6, 1981

[54] CONTINUOUS METHOD FOR DETERMINING RESIDUAL VINYL CHLORIDE CONTENT IN A BOILING AQUEOUS POLYMER DISPERSION

[75] Inventors: Eugene R. Moore; John S. Kowalczyk, both of Midland, Mich.

[73] Assignee: The Dow Chemical Company, Midland, Mich.

[21] Appl. No.: 923,593

[22] Filed: Jul. 11, 1978

[51] Int. Cl.³ ............................ B01D 3/42; C08F 6/10
[52] U.S. Cl. ............................................. 203/2; 203/3; 159/47 R; 422/62; 528/501
[58] Field of Search ..................... 203/2, 3, DIG. 18; 202/160; 422/62; 528/501; 159/1 R, 47 R

[56] References Cited

U.S. PATENT DOCUMENTS

| 2,299,899 | 10/1942 | Houghland | 203/2 |
| 2,339,026 | 1/1944 | Mercer | 202/160 |
| 2,342,206 | 2/1944 | McMillan | 202/160 |
| 2,386,601 | 10/1945 | Fisher | 203/2 |
| 3,809,621 | 5/1974 | Putman | 203/3 |
| 4,086,414 | 4/1978 | Hornbaker et al. | 528/501 |
| 4,104,459 | 8/1978 | Hornbaker et al. | 528/501 |

OTHER PUBLICATIONS

*Chem. Abstracts*, 66:29118t, (1967).
*Analyst* 94, 625–627, (1969).
*Chem. Abstracts*, 61:9646h, (1964).
*Chem. Spec. Mfrs. Assoc., Proc. Mid–Year Mtg.*, 51, 204–209, (1965).
*Chem. Abstracts*, 77:127080w, (1972).
*Chem. Abstracts*, 80:96391d, (1974).
*Chem. Abstracts*, 86:90661u, (1977).

*Primary Examiner*—Wilbur L. Bascomb, Jr.
*Attorney, Agent, or Firm*—T. R. Wills; D. R. Howard

[57] ABSTRACT

An improvement in a process for removing residual vinyl chloride monomer from an aqueous dispersion of a synthetic polymer wherein the dispersion is subjected to boiling conditions while being maintained in a vessel having a vapor space above the liquid level of the dispersion. In the improved process, the content of vinyl chloride monomer in the dispersion is continuously monitored by a boiling point suppression technique.

3 Claims, 1 Drawing Figure

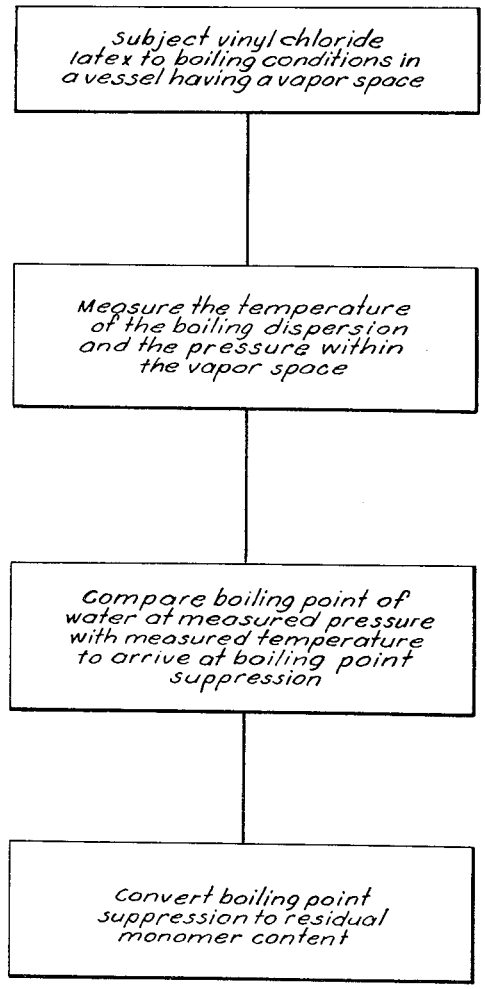

```
┌─────────────────────────────┐
│    Subject vinyl chloride   │
│  latex to boiling conditions in │
│   a vessel having a vapor space │
└─────────────────────────────┘
              │
┌─────────────────────────────┐
│   Measure the temperature   │
│   of the boiling dispersion │
│   and the pressure within   │
│        the vapor space      │
└─────────────────────────────┘
              │
┌─────────────────────────────┐
│   Compare boiling point of  │
│  water at measured pressure │
│  with measured temperature  │
│   to arrive at boiling point│
│          suppression        │
└─────────────────────────────┘
              │
┌─────────────────────────────┐
│     Convert boiling point   │
│  suppression to residual    │
│       monomer content       │
└─────────────────────────────┘
```

CONTINUOUS METHOD FOR DETERMINING RESIDUAL VINYL CHLORIDE CONTENT IN A BOILING AQUEOUS POLYMER DISPERSION

BACKGROUND OF THE INVENTION

The present invention relates to a process for removing residual vinyl chloride monomer from an aqueous dispersion of a synthetic polymer. More specifically, it relates to a method for determining the residual vinyl chloride content of the dispersion during the monomer removal process.

Polymers of vinyl chloride may be obtained by polymerizing the constituent monomer or monomers using an aqueous emulsion, suspension, or microsuspension process. The resulting products, being in the form of an aqueous latex or suspension, i.e., an aqueous dispersion, invariably contain a significant quantity of residual monomer. In many instances, it is desirable to remove substantially all of the residual monomer from the dispersion, e.g., in those cases where the quality of the polymer is thereby improved, where the monomer merits recovery for further use, and/or where the presence of even minor quantities of residual monomer in the polymeric product would create problems in handling and use due to toxicological hazards. In cases where the monomer is a low boiling material and the polymerization has been carried out under autogenous pressure, much of the residual monomer remaining in the reaction vessel at the end of polymerization can be removed simply by venting the vessel. Nevertheless, the resulting dispersion will still contain an appreciable amount of residual monomer.

Conventionally, residual vinyl chloride monomer has been further removed from an aqueous dispersion after polymerization by heating and/or reducing the pressure within the reaction vessel, i.e., by subjecting the dispersion to boiling conditions. Since this method alone is not entirely acceptable for larger and deeper reaction vessels due to the difference in hydrostatic pressure between the top and bottom of the vessel and, accordingly, the non-uniform monomer removal rate therein, agitation and/or circulation within the reaction vessel have been suggested.

During such processes, it is necessary to monitor the content of vinyl chloride monomer in the dispersion so that the appropriate time for termination can be ascertained. Conventionally, such monitoring is accomplished by periodically sampling the dispersion and analyzing the sample by gas chromatography and/or infrared spectroscopy. Even though these monitoring techniques are highly accurate, they are attended by a number of significant problems. For example, such monitoring can cause an interruption in the removal process while the sample is being taken and analyzed and it has the potential for exposing an operator to contact with the dispersion while it is still in a toxicologically hazardous condition. Additionally, such monitoring inherently includes a time lag between sampling and termination of the process due to the period required for analyzing. Consequently, the decision to terminate is necessarily postponed beyond the time at which it could have been made. Such postponement is uneconomical and, further, it has the potential in some cases for causing polymer degradation due to the unnecessarily prolonged heat treatment of the dispersion.

Accordingly, it would be desirable to have a reliable method for monitoring the residual vinyl chloride content which would eliminate the possibility of operator contact, which would not cause an interruption in the removal process, and which could provide a nearly instantaneous indication of monomer content so that the decision to terminate could be made as soon as possible.

SUMMARY OF THE INVENTION

The present invention provides an improvement in a process for removing residual vinyl chloride monomer from an aqueous dispersion of a synthetic polymer prepared from vinyl chloride and, optionally, an ethylenically unsaturated comonomer having a boiling point greater than vinyl chloride wherein the dispersion is subjected to boiling conditions while being maintained in a vessel having a vapor space above the liquid level of the dispersion. In the improved process, the content of vinyl chloride monomer in the dispersion is continuously monitored by the steps comprising:

(a) measuring the temperature of the boiling dispersion;

(b) measuring the pressure of the vapor above the boiling dispersion; and (c) comparing the boiling point of water at the pressure measured in step (b) with the temperature measured in step (a) to ascertain the boiling point suppression of the dispersion.

In a preferred embodiment, the aqueous dispersion is in the form of a latex and the ethylenically unsaturated comonomer is vinylidene chloride.

DETAILED DESCRIPTION OF THE INVENTION

The aqueous dispersions of synthetic polymer of the present invention are obtained by polymerizing vinyl chloride and, optionally, an ethylenically unsaturated comonomer by known methods of polymerization in aqueous emulsion, suspension, or microsuspension. Of these, a dispersion obtained by emulsion polymerization, i.e., a latex, is generally preferred since the particles of such a dispersion are characteristically much smaller and, consequently, the removal of vinyl chloride monomer depends principally upon the rate at which monomer diffuses through the aqueous phase rather than upon the rate at which it diffuses through the polymer phase. If the particles of the dispersion are substantially porous, however, the size of the particles is of lesser importance inasmuch as monomer removal will still depend primarily on the rate of diffusion through the aqueous phase, which includes the aqueous phase contained within the pores of the particles. Accordingly, the dispersions of synthetic polymer which are operable in the present invention can be generally categorized as those satisfying the abovementioned criteria of size or porosity.

Exemplary ethylenically unsaturated comonomers which can be copolymerized with vinyl chloride include vinylidene chloride, acrylonitrile, vinyl acetate, methyl acrylate, methyl methacrylate, vinyl propionate, and the like. The proportion of comonomer, if any, in the resulting synthetic polymer is not critical. It is necessary, however, that the comonomers used have a boiling point greater than that for vinyl chloride.

For purposes of the present invention, it is immaterial whether the aqueous dispersion of synthetic polymer is subjected to boiling conditions in the polymerization vessel or in another independent vessel. It is necessary only that the vessel have sufficient vapor space above the liquid level of the aqueous dispersion therein to permit measurement of the vapor pressure within the vessel. It is advantageous, however, that the vessel include suitable means for circulating or agitating the dispersion so that generally uniform monomer concentration can be maintained throughout the depth of the dispersion.

The temperature and pressure conditions within the vessel do not appear to be critical for effective utilization of the present monitoring technique so long as the conditions are such that the dispersion will be generally maintained in a state of boiling. As will be readily apparent to those skilled in the art, however, extreme temperatures can have a deleterious effect on the quality of certain polymers, especially certain sensitive latexes of vinyl/vinylidene chloride copolymers. Accordingly, the temperature will be chosen to avoid such an effect. It will be further apparent that very low pressures may create excessive foaming problems in the case of certain latexes due to the surfactants present therein. Such foaming problems can be avoided by operating at higher pressures, i.e., by reducing the rate of monomer removal, or by employing antifoaming agents known in the art. A convenient method for monitoring foam height within the vessel and, accordingly, the optimum operating pressure for rapid monomer removal is by means of a suitable capacitance probe as described in U.S. Pat. No. 3,306,341.

Pressure and temperature are conveniently measured by conventional means such as, respectively, a differential pressure cell and a thermocouple. Advantageously, these devices are associated with suitable computer means which will simultaneously (a) convert the pressure signal to the boiling point of water at that pressure and (b) compare the so-computed boiling point with the temperature of the dispersion to determine the boiling point suppression value for the dispersion. The boiling point suppression value, being proportional to the content of vinyl chloride monomer in the dispersion, is preferably recorded on a continuous chart to enable an operator to follow the course of monomer removal. Alternatively, the computer can be programmed to print out the content of vinyl chloride monomer directly.

The following specific examples illustrate the invention but are not to be taken as limiting its scope. Parts and percentages are by weight unless otherwise indicated.

EXAMPLE 1

A vinyl chloride polymer latex, having a solids content of about 35 percent, was treated according to the process of the present invention to remove residual vinyl chloride monomer. The latex had been earlier prepared by emulsion polymerizing vinyl and vinylidene chloride monomers to obtain a polymeric product comprising about 78 percent vinylidene chloride (VDC) and 22 percent vinyl chloride (VCl).

One liter of the latex was placed in a three liter pressure vessel equipped with a thermocouple and differential pressure cell as hereinbefore described. The vessel was evacuated and then pressurized with vinyl chloride monomer, thereby raising the content of vinyl chloride in the latex to a sufficiently high concentration to permit a more thorough study of the effectiveness of the present invention. When the pressure within the vessel had leveled off, signifying that the system had reached equilibrium, the temperature was increased to about 40° C. and the pressure was reduced at a rate such that constant boiling of the latex occurred.

While the latex was boiling, periodic measurements of boiling point suppression ($\Delta T$) in °C. were made at the same time that samples were being withdrawn and analyzed for vinyl chloride content by conventional gas chromatography methods.

To evaluate the results of this test, values of $\Delta T$ vs concentration obtained from such measurements were plotted on standard graph paper and a straight line was force-fitted to the data points such that the line passed through a value of zero $\Delta T$ at zero concentration. The equation for the resulting straight line can be expressed as $$143.9 \times \Delta T(°C.) = \text{concentration of vinyl chloride,}$$

wherein concentration is measured in parts of vinyl chloride per million parts of the solids in the latex (ppm). Having thus calculated the relationship between $\Delta T$ and concentration, the calculated values were compared with the actual concentration of vinyl chloride as previously measured by gas chromatography.

The results of this comparison, as shown in Table I, demonstrate that concentration values as calculated by boiling point suppression measurements are indicative (with reasonable accuracy) of the actual concentration of vinyl chloride monomer in the latex.

TABLE I

| $\Delta T$ (°C.) | Calculated Concentration (ppm) | Actual Concentration (ppm) |
|---|---|---|
| 58.0 | 8348 | 8101 |
| 18.2 | 2619 | 2827 |
| 8.6 | 978 | 861 |
| 1.4 | 201 | 503 |
| 0 | 0 | 142 |

EXAMPLE 2

The procedure of Example 1 was repeated in two separate tests except that the temperature was maintained at about 30° C. and 50° C., respectively. The values of $\Delta T$ vs concentration for these tests were very similar to the values obtained in Example 1, thereby demonstrating that the effectiveness of the monitoring technique of the present invention does not substantially depend upon the temperature of the boiling dispersion.

EXAMPLE 3

The procedure of Example 1 was repeated except that the latex also contained 295 ppm ethylene dichloride based on the weight of solids in the latex. The data obtained by this test was found to approximate an equation expressed as $$182 \times \Delta T(°C.) = \text{concentration of vinyl chloride.}$$

In a similar test, but using a 750 gal reactor containing about 500 gal of a latex also having 2050 ppm ethylene dichloride based on the weight of solids in the latex, the data approximated an equation expressed as $$131.6 \times \Delta T(°C.) = \text{concentration of vinyl chloride.}$$

It can be seen from these tests that variations in the amount of volatiles other than vinyl chloride in the dispersion will change the relationship between concentration of vinyl chloride and boiling point suppression. However, such an effect will not be deleterious to the utility of the present monitoring technique so long as the user corrects the equation for each different dispersion by simple preliminary experimentation. Since essentially similar dispersions are repeatedly prepared in large scale commercial operation, it will be appreciated that only a few preliminary experiments will be required to apply the present monitoring technique to the range of dispersion products prepared by any one commercial user.

EXAMPLE 4

The procedure of Example 1 was followed using a dispersion of porous suspension polymerized polymer particles comprising about 18 percent VCl and 72 percent VDC.

The results of this test, as shown in Table II, demonstrate the effectiveness of the present monitoring technique when used in a dispersion containing larger but porous polymer particles.

TABLE II

| $\Delta T$ (°C.) | Calculated Concentration (ppm*) | Actual Concentration (ppm*) |
|---|---|---|
| 26 | 3700 | 3320 |
| 20 | 3000 | 2650 |
| 13.5 | 2050 | 1920 |
| 8.5 | 1250 | 1100 |

TABLE II-continued

| $\Delta T$ (°C.) | Calculated Concentration (ppm*) | Actual Concentration (ppm*) |
|---|---|---|
| 5.0 | 750 | 725 |
| 4.0 | 610 | 610 |
| −2 | 0 | 75 |

*Based on the weight of solids in the suspension

What is claimed is:

1. In a process for removing residual vinyl chloride monomer from an aqueous dispersion of a synthetic polymer prepared from vinyl chloride and, optionally, an ethylenically unsaturated comonomer having a boiling point greater than vinyl chloride, wherein the dispersion is subjected to boiling conditions while being maintained in a vessel having a vapor space above the liquid level of the dispersion, the improvement consisting of continuously monitoring the content of vinyl chloride monomer in the dispersion by the steps comprising:

(a) measuring the temperature of the boiling dispersion;

(b) measuring the pressure of the vapor above the boiling dispersion; and (c) comparing the boiling point of water at the pressure measured in step (b) with the temperature measured in step (a) to ascertain the boiling point suppression of the dispersion.

2. The process of claim 1 wherein the dispersion is a latex.

3. The process of claim 2 wherein the ethylenically unsaturated comonomer is vinylidene chloride.

* * * * *